United States Patent
Joly et al.

(10) Patent No.: US 7,289,590 B2
(45) Date of Patent: Oct. 30, 2007

(54) METHOD AND APPARATUS FOR HANDLING A TUBE GUIDE OF UPPER INTERVAL EQUIPMENT OF A NUCLEAR REACTOR

(75) Inventors: Sébastien Joly, Chalons-sur-Marne (FR); Daniel Grypczynski, Lyons (FR); Gilles Morel, Saint Mard En Vaux (FR)

(73) Assignee: Framatome ANP, Courbeovie (FR)

( * ) Notice: Subject to any disclaimer, the term of this patent is extended or adjusted under 35 U.S.C. 154(b) by 0 days.

(21) Appl. No.: 11/138,454

(22) Filed: May 27, 2005

(65) Prior Publication Data

US 2006/0039523 A1 Feb. 23, 2006

Related U.S. Application Data

(63) Continuation of application No. 10/734,247, filed on Dec. 15, 2003, now abandoned.

(30) Foreign Application Priority Data

Dec. 16, 2002 (FR) .................................. 02 15935

(51) Int. Cl.
*G21C 19/00* (2006.01)
(52) U.S. Cl. ..................... 376/262; 376/260; 376/233
(58) Field of Classification Search ................ 376/262, 376/260, 233
See application file for complete search history.

(56) References Cited

U.S. PATENT DOCUMENTS

| 3,654,686 | A | | 4/1972 | McFarland et al. |
|---|---|---|---|---|
| 3,768,668 | A | | 10/1973 | Schukei |
| 3,856,621 | A | | 12/1974 | Suvanto et al. |
| 4,377,956 | A | | 3/1983 | Cooper |
| 4,885,123 | A | | 12/1989 | Ikeuchi et al. |
| 4,919,881 | A | * | 4/1990 | Hankinson et al. ......... 376/260 |
| 5,020,210 | A | * | 6/1991 | Fujimoto ..................... 483/54 |
| 5,127,145 | A | | 7/1992 | Ross |
| 2002/0165469 | A1 | * | 11/2002 | Murakami ..................... 601/2 |

FOREIGN PATENT DOCUMENTS

| EP | 0228684 | 7/1987 |
|---|---|---|
| EP | 0362005 | 4/1990 |

* cited by examiner

*Primary Examiner*—Ricardo J. Palabrica
(74) *Attorney, Agent, or Firm*—Connolly Bove Lodge & Hutz LLP

(57) ABSTRACT

A device for handling a guide tube assembly. The assembly has an upper tube and a lower tube in each of which there are fixed horizontal guide plates arranged such that they are spaced apart in an axial direction. The handling device itself includes a gripper having a tubular body and two opposing arms located at one end of the tubular body and moveable between a retracted position and a deployed position, the arms bearing against a lower surface of a contacted guide plate when in the deployed position. A control member is located at an opposite end of the tubular body for controlling the arms. The length of the tubular body of the gripper selected to be: a) greater than the distance between an upper end of the upper tube and a first guide plate of the lower tube; and b) less than the distance between the upper end of the upper tube and a third guide plate of the second tube.

6 Claims, 8 Drawing Sheets

Figure 1:
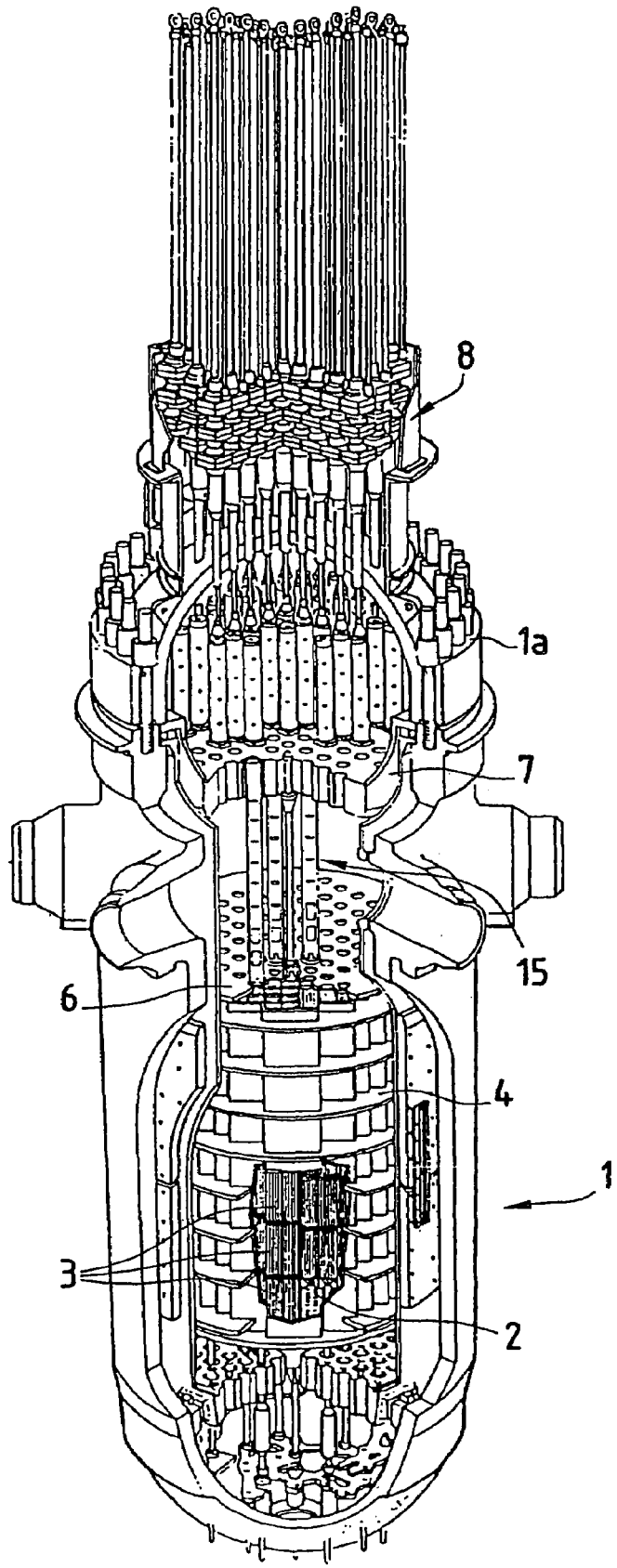

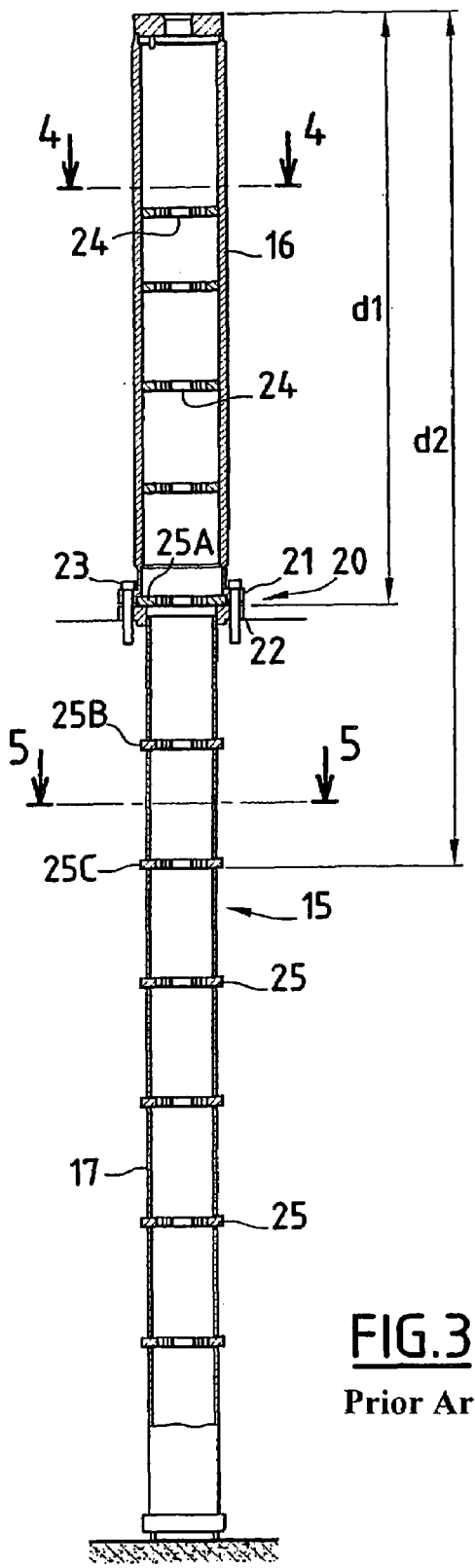
FIG.3
Prior Art
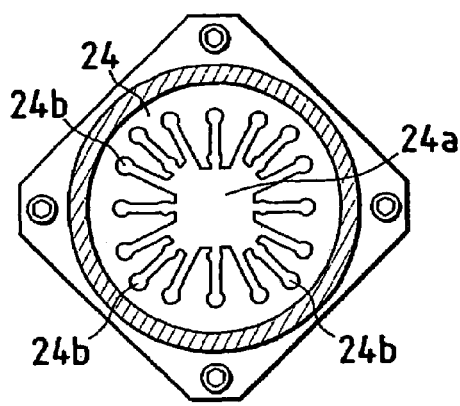
FIG.4
Prior Art
FIG.5
Prior Art

METHOD AND APPARATUS FOR HANDLING A TUBE GUIDE OF UPPER INTERVAL EQUIPMENT OF A NUCLEAR REACTOR

This application is a Continuation of application Ser. No. 10/734,247, filed on Dec. 15, 2003 now abandoned, and for which priority is claimed under 35 U.S.C. § 120; and this application claims priority of Application No. 0215935 filed in France on Dec. 16, 2002 under 35 U.S.C. § 119; the entire contents of all are hereby incorporated by reference.

The present invention relates to a method and to a device for handling a pressurized water nuclear reactor upper internals guide tube.

Pressurized water reactors comprise, inside a vessel, the nuclear reactor core which consists of assemblies of prismatic shape arranged with their axis vertical and, over the core, upper internals comprising, in particular, a collection of vertical guide tubes for guiding the rod cluster control assembly consisting of bundles of rods placed parallel to one another and containing a neutron-absorbing material.

The nuclear reaction that produces the supply of heat transmitted to the heat transfer fluid consisting of pressurized water is controlled or shut down using rod cluster control assemblies that are introduced into the guide tubes of a fuel assembly arranged inside the array of fuel rods of the assembly, these guide tubes also constituting part of the framework of this assembly. The rod cluster control assemblies are moved in the reactor core in its vertical direction to control the nuclear reactor, as a function of the depletion of the enriched uranium of the pellets contained in the fuel rods and the variations in power demand from the grid. The movement of the rod cluster control assemblies in the axial direction of the guide tube of the fuel assemblies is performed by control mechanisms placed on the head of the reactor vessel containing the core.

The guide tubes that guide the rod cluster control assemblies are each formed of an upper tube and of a lower tube which are connected to the upper support plate (PSTG) by assembly means comprising flanges attached to each other and fixed using screws. The upper tube of the guide tube is intended to be placed above the lower tube, above the upper support plate.

The upper and lower tubes of the guide tube are internally equipped with guide plates secured to these tubes and arranged such that they are spaced apart in the axial direction of the guide tube. Each of these guide plates has guide openings for guiding the corresponding rod cluster control assembly. The lower tube at its bottom end has a flange equipped with two centring pins that serve to position the guide tube on the nuclear reactor upper core plate. The screws that pass through the flanges of the upper and lower tubes of the guide tubes serve to fix the guide tubes into the upper internals on the upper support plate.

While the nuclear reactor core is shut down, the guide tubes are sometimes removed, either in order to replace them with new guide tubes, or to fit them with new centring pins.

To do that, the guide tubes are extracted from the upper internals arranged in the bottom of the reactor pit, on a storage and maintenance stand. The operators work from a working platform situated over the water of the pit and each guide tube is equipped with a gripping and handling tool that allows the two tubes of each guide tube to be secured together to hold it together mechanically while it is being handled once the connecting screws that join these two tubes have been removed.

For this, the gripping and handling tool enters the guide tube from above and passes through its entire height to bear against its underside. This tool in particular passes through the lower tube of the guide tube which comprises horizontal guide plates in its discontinuous guidance region and continuous guidance at its lower part.

As a result, introducing the tool over the entire height of the guide tube increases the risks that this tool will catch on the guide plates. This risk therefore dictates that, on completion of the operations of handling and refitting the guide tubes, the interior of the guide tube and all the horizontal guide plates together with the continuous guide part be systematically inspected.

In consequence, apart from the significant amount of time needed to introduce the gripping and handling tool, there also has to be added the time needed for the inspection. These operations are therefore expensive and any damage that might be caused could lead to the replacement or repair of the damaged elements.

In addition, given the great length of the gripping and handling tool, it is not easy for the operators situated on the working platform to use, either for its assembly of the two parts of the guide tubes or for the operations of handling and of introduction into the guide tube.

It is an object of the invention to propose a method and a device for handling a nuclear reactor upper internals guide tube that avoids the aforementioned drawbacks.

The subject of the invention is therefore a method for handling a guide tube for the upper internals of a nuclear reactor arranged under water in a pit, the said guide tube comprising two independent tubes, an upper one and a lower one, in each of which there are fixed horizontal guide plates arranged such that they are spaced apart in the axial direction of the guide tube and comprising a central cavity and guide openings for guiding a rod cluster control assembly that controls the reactivity in the core of the reactor, in which method a gripper equipped at a first end with two opposed arms that can be moved between a retracted position and a deployed position and, at a second end, with a control member for controlling the said arms is introduced into the central cavity of the horizontal guide plates of the upper tube, characterized in that:
- the first end of the gripper is placed under one of the two upper guide plates of the lower tube,
- the arms are deployed by means of the control member, using this control member the two arms are applied under the said upper guide plate of the lower tube on the one hand and the second end of the gripper is applied to the upper end of the upper tube on the other hand, and
- the gripper is used to simultaneously raise the upper and lower tubes of the guide tube.

According to another feature of the invention, the gripper is rotated about its longitudinal axis into a given position according to marks formed on the upper end of the upper tube when the first end of the gripper is placed under the second upper guide plate.

Another subject of the invention is a device for handling a guide tube for the upper internals of a nuclear reactor arranged under water in a pit, the said guide tube comprising two independent tubes, an upper one and a lower one, in each of which there are fixed horizontal guide plates arranged such that they are spaced apart in the axial direction of the guide tube and comprising a central cavity and guide openings for guiding a rod cluster control assembly that controls the reactivity in the core of the reactor, the said device being formed of a gripper comprising a tubular body equipped at one end with two opposed arms that can be moved between a retracted position and a deployed position and, at a second end, with a control member for controlling the said arms, characterized in that the length of the tubular body of the gripper is greater than the distance separating the upper end of the upper tube and the first guide plate of the lower tube and less than the distance separating the said upper end and the third guide plate of the said lower tube.

According to other features of the invention:
the tubular body has, at its second end, a bearing piece for bearing against the upper end of the upper tube, the said bearing piece supporting the said control member,
the said control member, first of all, deploys the arms then, secondly, brings these arms closer to the bearing piece,
the bearing piece comprises, on its face in contact with the upper end of the upper tube, at least one elastic washer,
the control member comprises a load-limiting spring and is connected to the arms by a screw-nut system.

Figure 2:
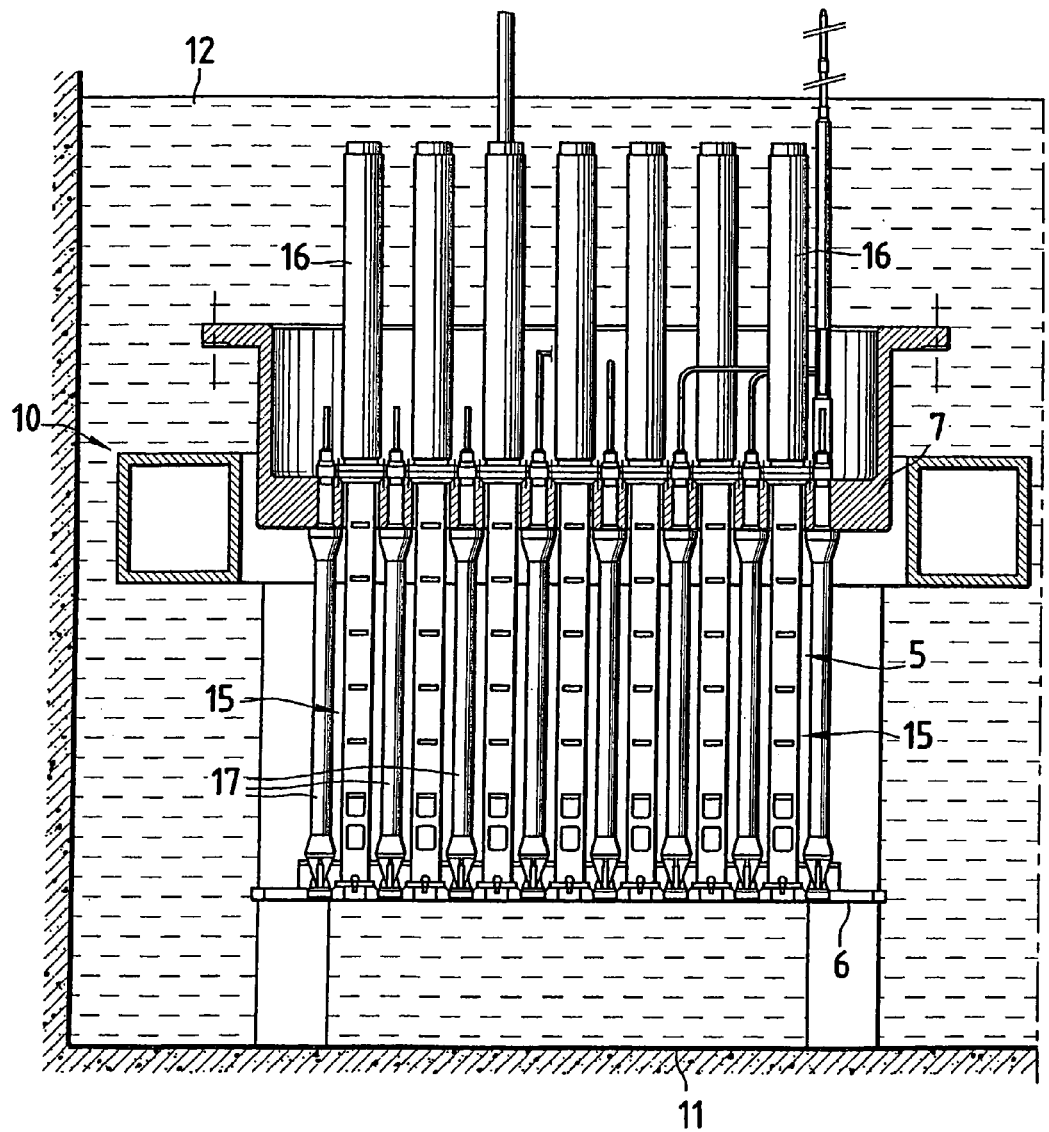
Figure 6:
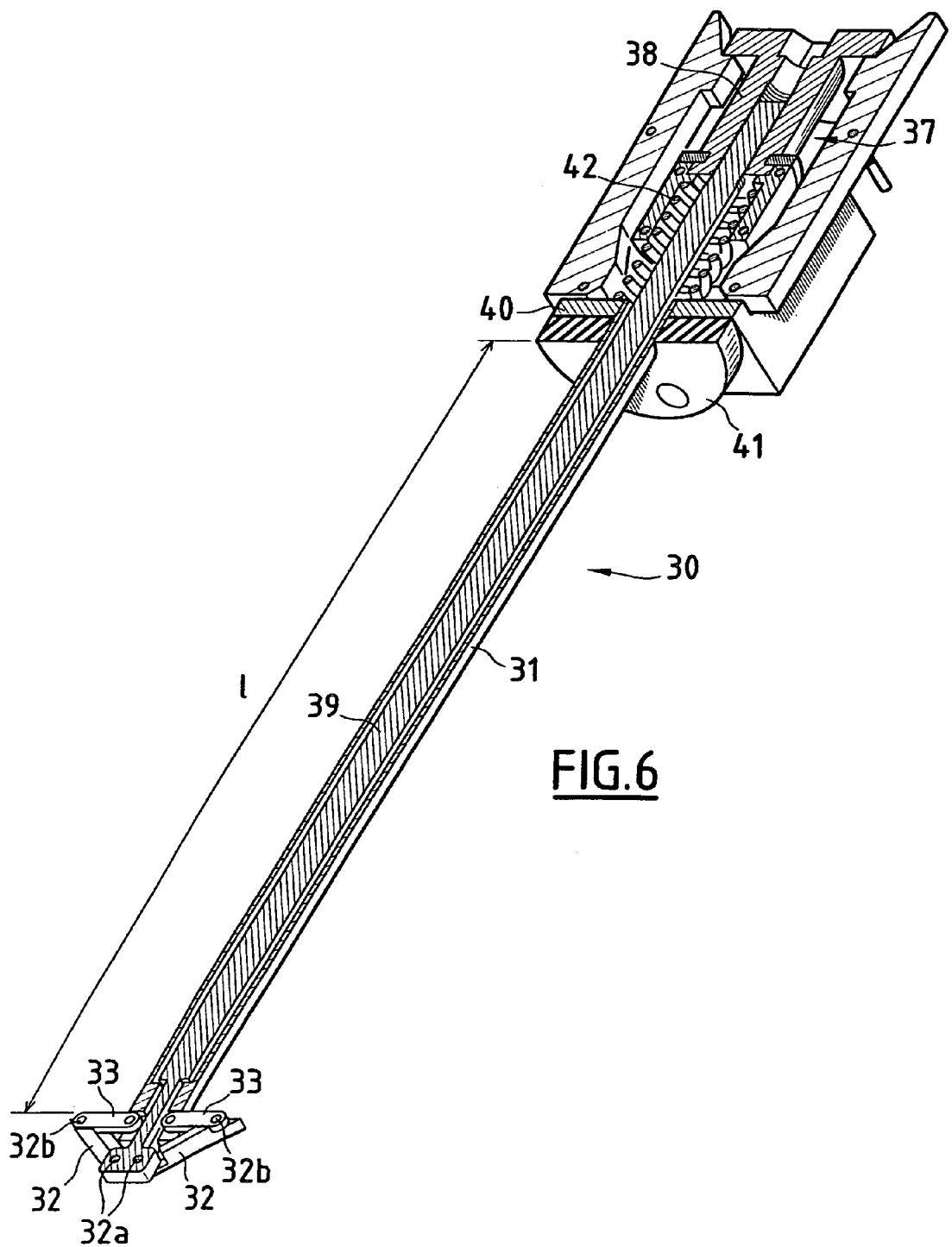
Figure 7A:
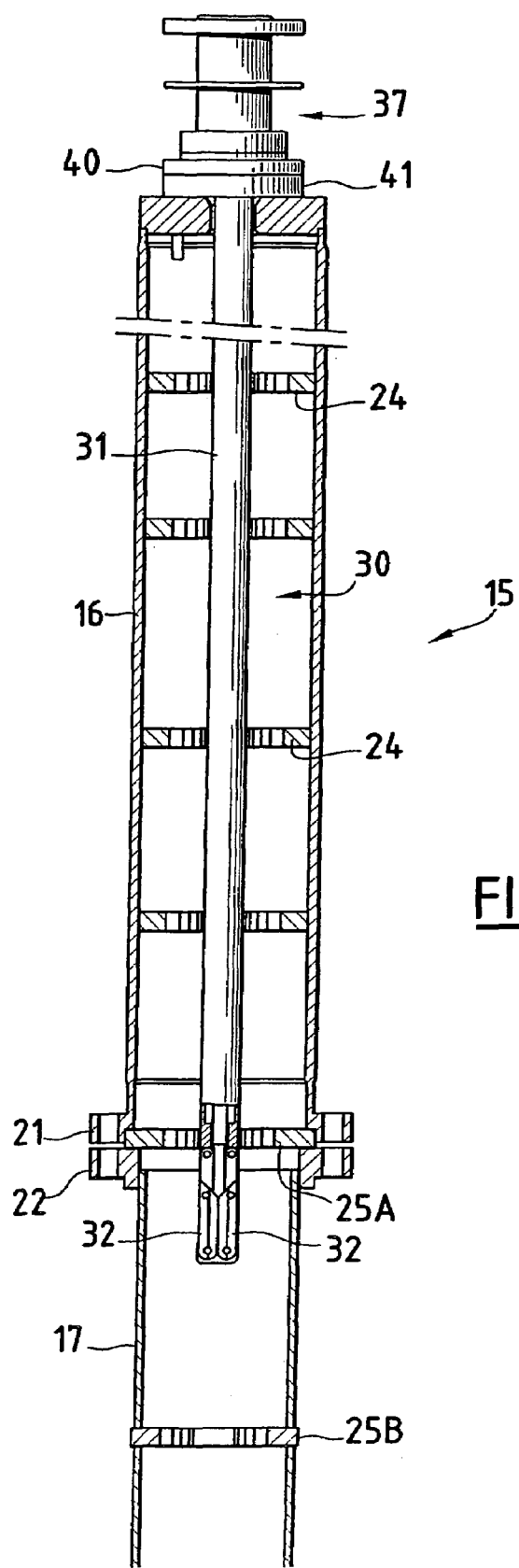
Figure 7B:
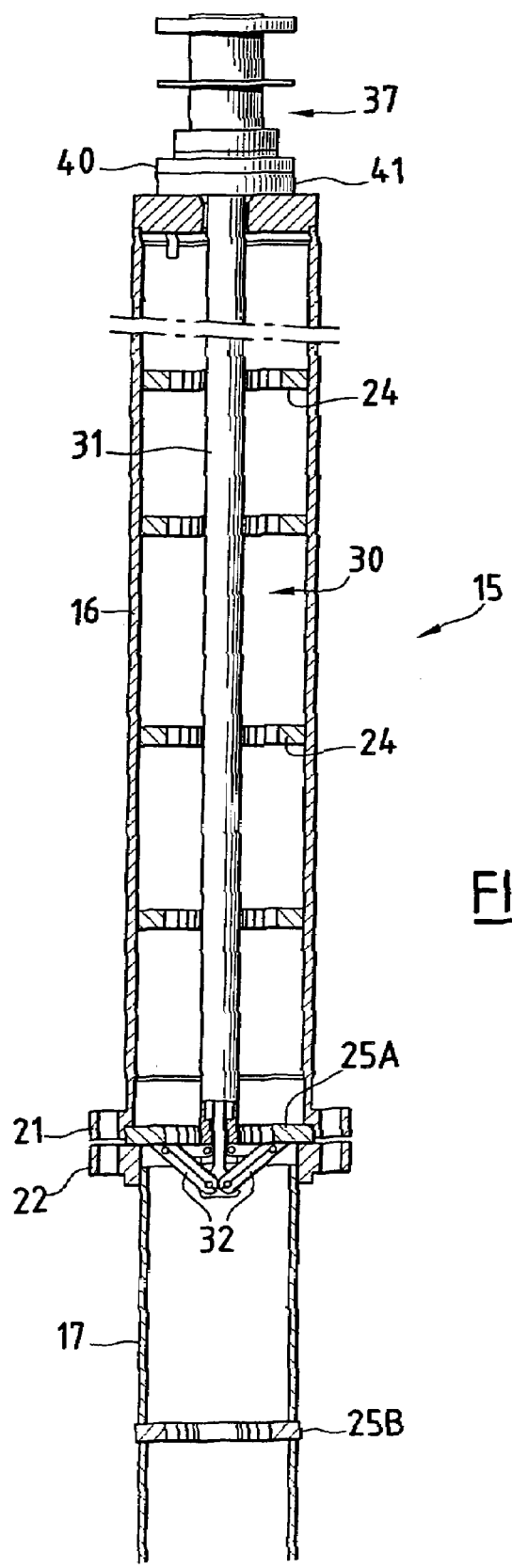
Figure 8A:
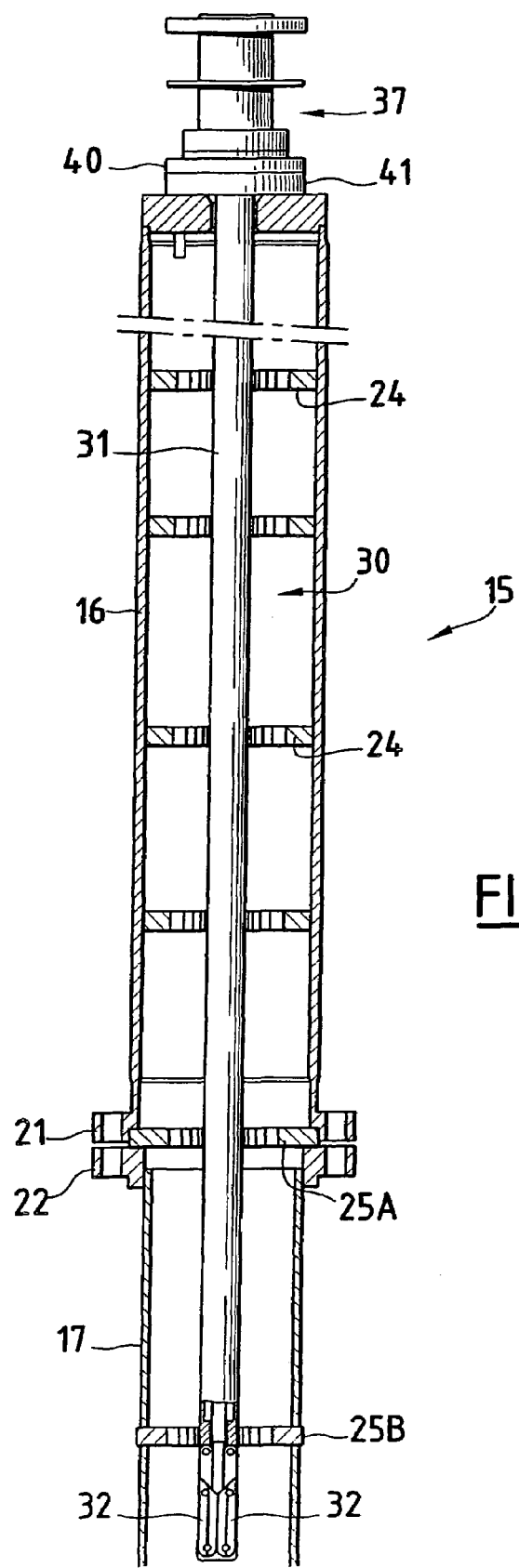
Figure 8B:
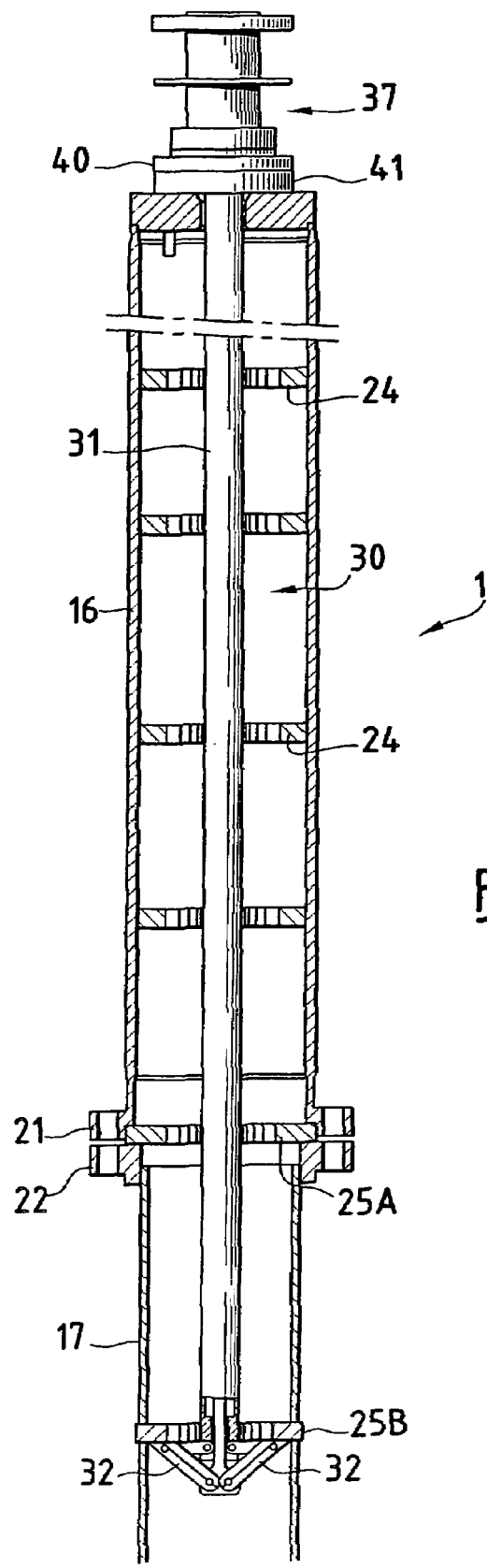

Other features and advantages of the invention will become apparent from reading the description which will follow, given by way of example and made with reference to the appended drawings in which:

FIG. 1 is a schematic exploded perspective view of a pressurized water reactor vessel, FIG. 2 is a schematic elevation of the upper internals of the nuclear reactor, in position on a storage stand in the pit of this reactor, during an inspection operation, FIG. 3 is a schematic view in longitudinal section of an upper internals guide tube, FIG. 4 is a schematic view in cross section on 4-4 of FIG. 1, FIG. 5 is a schematic view in cross section on 5-5 of FIG. 1, FIG. 6 is a schematic view in perspective and in longitudinal section of a device for handling a guide tube according to the invention, FIGS. 7A and 7B are schematic views in longitudinal section of the upper part of the guide tube equipped with the handling device, in its introduction position and in its gripping position, respectively, in a first gripping configuration, FIGS. 8A and 8B are schematic views in longitudinal section of the upper part of the guide tube equipped with the handling device, in its introduction position and in its gripping position, respectively, in a second gripping configuration.

FIG. 1 schematically depicts a pressurized water reactor vessel denoted by the general reference 1.

In the conventional way, inside the nuclear reactor vessel 1 is the core 2 consisting of fuel assemblies 3 of straight prismatic shape placed side by side in such a way that the longitudinal axes of the fuel assemblies are vertical. The reactor core 2 is arranged inside the lower internals of the reactor which in particular comprise the core baffle assembly 4.

The upper internals 5 rest on the upper part of the core assemblies via an upper core plate 6.

The upper internals 5 comprise a guide tube support plate 7 known as the upper support plate (PSTG) parallel to the upper core plate 6 constituting the lower part of the upper internals which part is produced in such a way as to fix the upper internals inside the vessel in which there is also suspended a casing containing the baffle assembly 4 and the core 2 of the reactor, at the lower end of which is fixed a lower plate for supporting the assemblies of the core.

When the reactor is shut down for repair and for refuelling, the upper internals 5 are extracted from the reactor vessel 1 and placed on the storage stand 10 (FIG. 2), these upper internals 5 resting via the upper support plate 7 on the vertical supports of the stand 10 which themselves rest on the bottom 11 of the pit 12. This pit 12 of the reactor is filled with water to its upper level and the various operations are usually performed from a pit bridge arranged over the upper level of this pit 12. As shown in FIGS. 1 to 3, the upper internals 5 comprise guide tubes each denoted by the general reference 15, which are vertical and provide guidance to rod cluster control assemblies that control the reactivity in the reactor core, each rod cluster control assembly being formed of bundles of rods placed parallel to one another and containing a neutron-absorbing material.

As depicted in FIGS. 2 and 3, each guide tube 15 comprises, above the upper support plate 7 of the upper internals, an upper guide tube 16 of circular cross section and, between the upper support plate 7 supporting the upper internals 5 and the upper core plate 6, a lower guide tube 17 with a roughly square cross section with rounded corners. Each of the lower tubes 17 is axially aligned with an upper tube 16 and these two tubes, 16 and 17 respectively, constitute a guide tube 15 for the upper internals 5 allowing a rod cluster control assembly that controls the reactivity to be moved vertically in the reactor core, this rod cluster control assembly being connected to a suspension and movement rod whose movement in the vertical direction is given by a mechanism 8 situated above the head 1a of the vessel 1 (FIG. 1).

Between the support plate 7, the upper internals 5 and the upper core plate 6 there are placed, in addition to the lower tubes 17, spacer columns 9 that hold the upper core plate 6 away from the upper support plate 7 supporting the upper internals 5.

As depicted in FIG. 3, the upper 16 and lower 17 tubes of each guide tube 15 are connected together by assembly means denoted by the general reference 20. In a conventional way, these assembly means 20 comprise an upper flange 21 secured to the upper tube 16 and a lower flange 22 secured to the lower tube 17 and which are attached to one another and assembled using screws 23.

The upper tube 16 arranged above the support plate 7 contains discontinuous guide elements consisting of horizontal guide plates 24 of circular cross section, as shown in FIG. 4. These guide plates 24 are arranged spaced apart in the axial direction of the guide tube 15 and each comprises a central cavity 24a and radially directed openings 24b each opening at its inner end into the said central cavity. Each of the radially directed openings at its outmost end has a roughly circular opening for guiding the absorber rod of a rod cluster control assembly.

The lower tube 17 of the guide tube 15 of roughly square cross section, placed between the upper support plate 7 supporting the internals 5 and the upper core plate 6, comprises an upper part in which the rod cluster control assembly has discontinuous guidance, like in the upper tube 16, via horizontal guide plates 25 as depicted in FIG. 5.

Each horizontal guide plate 25 comprises a central cavity 25a and radially directed openings 25b opening at their inner end into the central cavity 25a of the said guide plate 25. The circular openings 25b provide guidance for the absorber rods in the same way as the openings 24b of the guide plates 24. The lower part of the lower tube 17 of the guide tube 15 constitutes a continuous guidance region in which elements for guiding the absorber rods of the rod cluster control assembly are fixed, which elements consist of continuous guide sleeves and of split tubes, not depicted.

As shown in FIG. 3, the lower tube 17 of the guide tube 15 comprises, from top to bottom, a first horizontal guide plate referenced 25A, a second horizontal guide plate referenced 25B, a third horizontal guide plate referenced 25C and so on over the entire height of the first part of the lower tube 17. In the description that follows, the guide plate 25A will be known as the first upper guide plate 25A, the guide plate 25B will be known as the second upper guide plate 25B and the third guide plate 25C will be known as the third upper guide plate 25C.

In the conventional way, the first upper guide plate 25A is positioned in a spot face formed on the upper face of the flange 22 and this guide plate 25A is fixed to the said flange 22 by screwing elements, not depicted, consisting, for example, of screws the heads of which are embedded in the thickness of the said guide plate 25A. The second upper guide plate 25B is fixed to the lower tube 17 by welding.

To remove a guide tube 15 from the upper internals 5, the operators, having removed the fixing elements 23 on the upper support plate 7 supporting the guide tubes 15, use a handling device formed of a gripper denoted by the general reference 30 and depicted in FIG. 6.

This gripper 30 is formed of a tubular body 31 equipped, at a first end, with two opposed arms 32 and, at a second end, with a control member 37 for moving the arms 32 between a retracted position and a deployed position, as will be seen later.

In the exemplary embodiment depicted in FIG. 6, the control member 37 consists of a hexagon socket head 38 and is connected to the arms 32 by a screw-nut system 39 of known type. Each arm 32 comprises an end 32a mounted articulated at the end of the screw of the screw-nut system 39 and an end 39b mounted articulated on a link rod 33 which is itself mounted articulated at the end of the tubular body 31.

This tubular body 31 is equipped at its opposite end to the arms 32 with a piece 40 intended to bear against the upper end of the upper tube 16 of the guide tube 15 to be handled, and this piece 40 supports the control member 37. The piece 40 is also equipped, on its face in contact with the upper end of the upper tube 16, with at least one elastic washer 41. Finally, the control member 37 is equipped with a spring 42 to limit the load when the screw-nut system 39 is tightened. In general, the length "1" of the tubular body 31 (FIG. 6) is greater than the distance "d1" separating the upper end of the upper tube 16 and the first guide plate 25A of the lower tube 17 (FIG. 3) and less than the distance "d2" separating the said first end and the third guide plate 25C of the said lower tube (FIG. 3).

To remove the guide tube 15, the operators, for example using a pole, not depicted, introduce the tubular body 31 of the gripper 30 into the central cavity 24a of each horizontal guide plate 24 of the upper tube 16, the arms 32 being in the retracted position as shown in FIG. 7A. The elastic washer 41 of the bearing piece 40 rests against the upper end of the upper tube 16.

Next, the operators use a motorized tool, not depicted, comprising a turning element that positions itself in the hexagon socket head 38 to turn the screw-nut system 39. First of all, the turning of the screw-nut system 39 causes the arms 32 to move into the deployed position (FIG. 7B), and then, secondly, causes these arms 32 to move closer to the bearing piece 40.

Preferably and as depicted in FIGS. 7A and 7B, the arms 32 are applied against the first upper guide plate 25A of the lower tube 17 all the parts of which are rigid and which is connected to the lower tube 17 by screwing elements. The grip of the gripper 30 on the upper end of the upper tube 16 and against the upper guide plate 25A is limited by the spring 42.

According to an alternative form depicted in FIGS. 8A and 8B, the end of the tubular body 31 carrying the arms 32 is placed under the second guide plate 25B of the lower tube 17 (FIG. 8A). As the screw-nut system 39 is turned, the arms 32 move first of all into a deployed position. In this case, the operator, having placed the arms 32 under the guide plate 25B and deployed these arms 32, turns the gripper 30 about its longitudinal axis into a position determined according to marks formed on the upper end of the upper tube 16. This turning has the purpose of bringing the arms 32 under a rigid region of the said guide plate 25B. Secondly, these arms 32 are applied against the second upper guide plate 25B, as shown in FIG. 8B.

The gripper 30 therefore allows the upper 16 and lower 17 tubes to be secured together so as to mechanically hold the guide tube 15 together as it is handled. The gripper 30 has the advantage of being easy to manipulate on site by operators situated on the working platform of the stand, thus making the operations less tiresome for these operators. The time taken to introduce into the guide tube is reduced, which means that the intervention time is shorter.

In addition, the risks of catching on the inside of the guide tube are reduced and the inspection of the interior of the guide tube after the intervention can be confined to the upper tube and, at most, to the first two guide plates of the lower tube, making it possible to reduce the inspection time.

As a preference, the guide tube is handled by applying the arms of the gripper against the first upper guide plate of the lower tube, because the magnitudes of the forces applied to the fixing screws that secure this guide plate are known. Furthermore, this guide plate has the advantage of being removable, making it possible to envisage possibilities of removing it in order to perform an analysis and/or a replacement if the forces incurred are higher than the permissible forces.

The invention claimed is:

1. A guide tube assembly for upper internals of a nuclear reactor arranged under water in a pit and a device for handling the guide tube assembly, the combination comprising:

a) the guide tube assembly having an upper tube and a lower tube in each of which there are fixed horizontal guide plates arranged such that they are spaced apart in an axial direction, each guide plate including a central cavity and guide openings for guiding a rod cluster control assembly that controls reactivity in a core of the reactor, and b) the handling device including:

a gripper including a tubular body;

two opposing arms, constructed of symmetrically displaceable linkage assemblies, located at one end of the tubular body and moveable between a collapsed retracted position and an expanded deployed position, the arms bearing against a lower surface of a contacted guide plate when in the deployed position;

a control member located at an opposite end of the tubular body for controlling the arms;

an actuator rod axially slidable in the tubular body and connected at opposite ends thereof between the control member and the arm linkage assemblies for actuating the arms between the retracted and deployed positions;

the length of the tubular body of the gripper being:

greater than the distance between an upper end of the upper tube and a first guide plate of the lower tube; and less than the distance between the upper end of the upper tube and a third guide plate of the lower tube.

2. The device according to claim 1, wherein the tubular body has, at its second end, a bearing piece bearing against the upper end of the upper tube, the bearing piece supporting the control member.

3. The device according to claim 1, wherein the control member deploys the arms and displaces the arms toward the bearing piece.

4. The device according to claim 1, wherein the bearing piece, contacting the upper end of the upper tube, comprises, on its face, at least one elastic washer.

5. The device according to claim 1, wherein the control member comprises a load-limiting spring and is connected to the arms by a threaded assembly.

6. A guide tube assembly for upper internals of a nuclear reactor arranged under water in a pit and a device for handling the guide tube assembly, the combination comprising:

a) the guide tube assembly having an upper tube and a lower tube in each of which there are fixed horizontal guide plates arranged such that they are spaced apart in an axial direction, each guide plate including a central cavity and guide openings for guiding a rod cluster control assembly that controls reactivity in a core of the reactor, and b) the handling device including:

a gripper including a tubular body;

two opposing arms, constructed of symmetrically displaceable linkage assemblies, located at one end of the tubular body and moveable between a collapsed retracted position and an expanded deployed position, the arms bearing against a lower surface of a contacted guide plate when in the deployed position;

a control member located at an opposite end of the tubular body for controlling the arms;

an actuator rod axially slidable in the tubular body and connected at opposite ends thereof between the control member and the arm linkage assemblies for actuating the arms between the retracted and deployed positions;

the length of the tubular body of the gripper being:

greater than the distance between an upper end of the upper tube and a first guide plate of the lower tube; and less than the distance between the upper end of the upper tube and a third guide plate of the lower tube;

wherein the tubular body has, at its second end, a bearing piece bearing against the upper end of the upper tube, the bearing piece supporting the control member;

wherein the control member deploys the arms and displaces the arms toward the bearing piece;

and wherein the bearing piece, contacts the upper end of the upper tube, and includes on its face, at least one elastic washer;

and further wherein the control member comprises a load-limiting spring and is connected to the arms by a threaded assembly.

* * * * *